United States Patent [19]
Griswold

[11] 3,752,183
[45] Aug. 14, 1973

[54] FLOW VALVE HAVING TAPERED CUP

[75] Inventor: David E. Griswold, Corona, Del Mar, Calif.

[73] Assignee: Griswold Controls, Santa Ana, Calif.

[22] Filed: Dec. 2, 1971

[21] Appl. No.: 204,022

[52] U.S. Cl. ................................ 137/504, 137/517
[51] Int. Cl. .. F16k 31/163, F16k 31/36, F16k 3/76
[58] Field of Search.................... 137/504, 503, 517, 137/512.1, 625.3, 625.38, 625.39, 454.2

[56] References Cited
UNITED STATES PATENTS

| | | | |
|---|---|---|---|
| 2,917,074 | 12/1959 | Terry | 137/504 |
| 3,472,275 | 10/1969 | Castro et al. | 137/504 X |
| 2,245,271 | 6/1941 | Guill | 137/517 |
| 3,170,481 | 2/1965 | Presnell | 137/504 X |
| 3,256,905 | 6/1966 | Griswold et al. | 137/517 X |
| 3,285,282 | 11/1966 | Martin | 137/504 X |

FOREIGN PATENTS OR APPLICATIONS 366,022 5/1906 France............................... 137/504

*Primary Examiner*—Henry T. Klinksiek
*Assistant Examiner*—Robert J. Miller
*Attorney*—Charles G. Lyon et al.

[57] ABSTRACT

A flow control valve has a stationary member provided with an orifice plate together with a ported cup which slides within the opening in the orifice plate against the action of a spring, to provide substantially constant rate of flow under varying differential pressures across the cup. The ported cup has a generally cylindrical side wall and an end wall, the side wall having an outer surface comprising a first cylindrical surface near the end wall and a concentric second cylindrical surface axially spaced therefrom of smaller diameter, and a tapered surface joining the first and second cylindrical surfaces. Ports in the side wall extend through at least one of said cylindrical surfaces. This construction provides a minimum port area change which is lower than the range which can be obtained with the minimum width of a single port segment.

8 Claims, 5 Drawing Figures

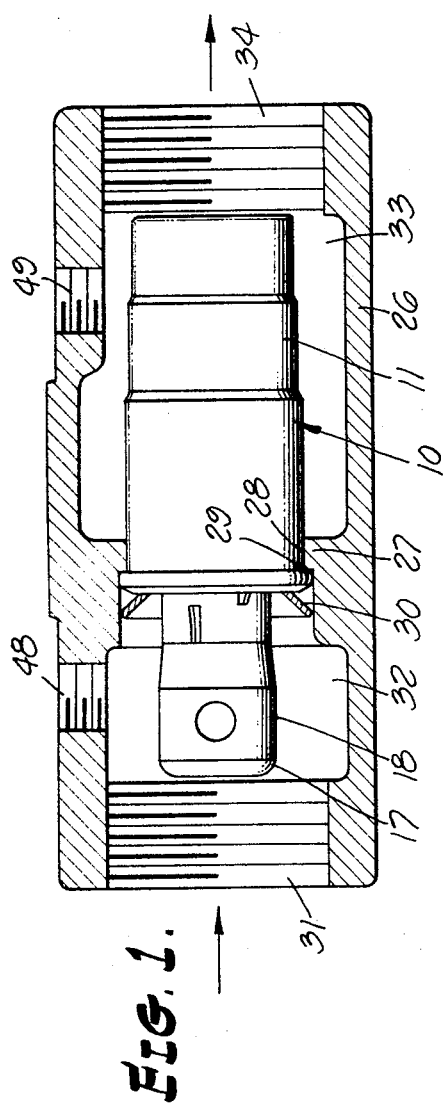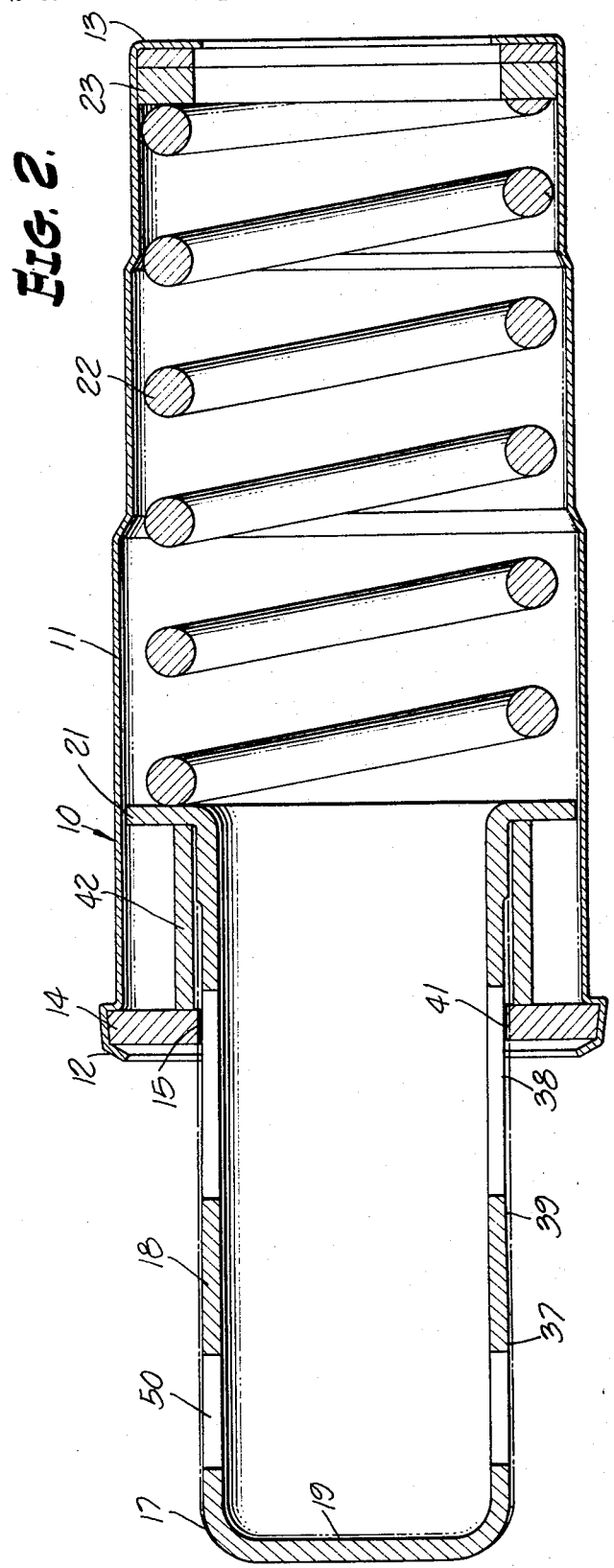

FLOW VALVE HAVING TAPERED CUP

This invention relates to flow control valves and is particularly directed to valves of the general type disclosed in U.S. Pat. Nos. 3,131,716 granted May 5, 1964, and 3,256,905 granted June 21, 1966, as well as in my copending application for "Flow Control Valve," Ser. No. 204,027 filed of even date herewith. Such flow control valves each employ a ported cylindrical cup axially slidable through a circular opening in a stationary member. A pressure differential across the cup causes it to slide through the opening against the action of a spring. Such movement of the cup changes the total combined area of a plurality of ports in the cup exposed to upstream pressure, so that the flow rate remains substantially constant regardless of the pressure differential.

The ports in the cylindrical side wall of the movable cup are shaped and positioned so that each increment of upstream pressure causes an increment of axial movement of the valve cup against a spring to reduce the total effective port area and thus hold the flow rate constant under increased pressure. In some cases, the minimum port area change requirement is lower than the range that can be covered with a single port or single port segment of minimum practical width. In accordance with this invention, an alternate area change capability is provided by employing a cup with a generally cylindrical side wall having an outer surface comprising a first cylindrical surface, a concentric second cylindrical surface axially spaced therefrom of smaller diameter, and a tapered surface joining said first and second cylindrical surfaces. The tapered surface functions in conjunction with the ports or port segments to maintain the constant flow rate characteristic but without employing any ports or port segments which are extremely narrow in width.

Other and more detailed objects and advantages will appear hereinafter.

In the drawings:

FIG. 1 is a side elevation partly in section showing a preferred embodiment of this invention.

FIG. 2 is a longitudinal sectional view showing a portion of the device illustrated in FIG. 1.

Figure 3:
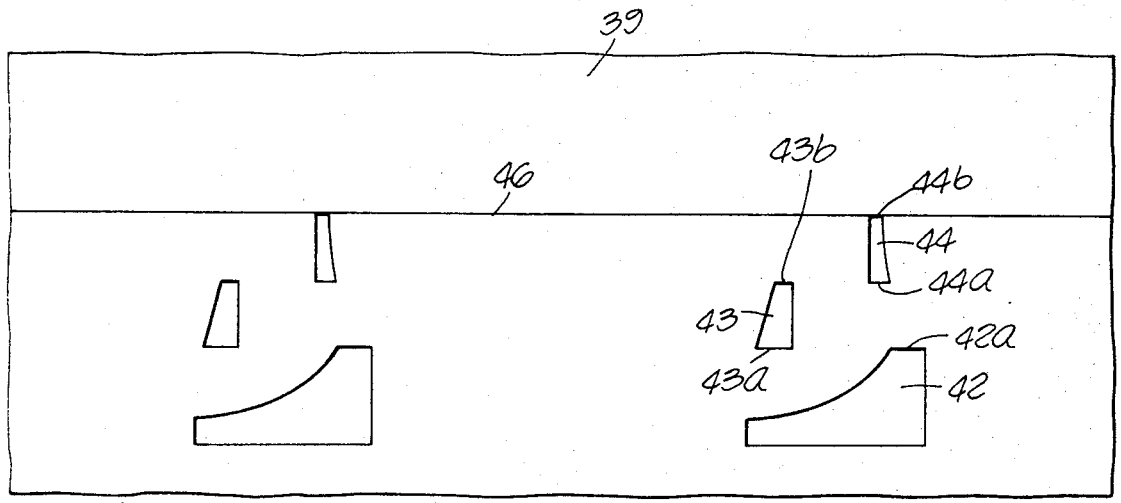
FIG. 3 is a diagrammatic developed view of the cylindrical portion of the cup shown in FIG. 2.

Referring to the drawings, the flow control valve generally designated 10 includes a stationary tubular shell 11 having a front flange 12 and a rear flange 13. A stationary orifice plate 14 is fixed to the shell 11 within the flange 12 and is provided with a central cylindrical opening 15. A cup element 17 is provided with a generally cylindrical side wall 18 and an integral end wall 19. The cylindrical wall 18 slides within the opening 15. The cup 17 is provided with an enlarged flange 21 which is engaged by one end of a coil compression spring 22 mounted within the shell 11. The other end of the spring 22 engages one of the series of annular shims 23 held by the spring against the rear flange 13.

The flow control valve 10 is mounted within the housing 26, as shown in FIG. 1. A barrier wall 27 within the interior of the housing 26 is provided with an opening 28 for reception of a portion of the shell 11. Cooperating shoulders 29 on the housing 26 and shell 11 are held in engagement by means of the wedge ring 30 to anchor the shell 11 against the barrier wall 27. The cup 17 is provided with apertures or ports, described in detail below, so that fluid may flow into the housing chamber 32 through the inlet connection 31 and then through the ports in the cup 17, through the interior of the shell 11, into the housing space 33 and out through the discharge connection 34. Pressure in the housing chamber 32 causes the cup 17 to slide axially into the shell 11 against the action of the spring 22. This general plan of operation is set forth in said prior U.S. Pat. Nos. 3,131,716 and 3,256,905 and in said copending application.

In accordance with the present invention, the generally cylindrical side wall 18 of the cup 17 has an outer surface comprising a first cylindrical surface 37 near said end wall 19, a concentric second cylindrical surface 38 axially spaced therefrom and of smaller diameter, and a frustoconical tapered surface 39 joining said cylindrical surfaces 37 and 38. The annular clearance space 41 between the cup side wall and the opening 15 is greatest when the parts are in the position shown in FIG. 2, and this annular clearance space is at a minimum when the cup 17 moves into the shell 11 against the action of the spring 22 to bring the cylindrical surface 37 within the opening 15. A stop collar 42 encircles a portion of the side wall 18 of the cup 17 and is confined between the orifice plate 14 and the cup flange 21. This stop collar serves to limit the travel of the cup 17 under force of the spring 22.

In the preferred form of the invention, the side wall 18 of the cup 17 is provided with a series of circumferentially staggered separate port segments 42, 43 and 44 (FIG. 3) which extend through the cylindrical surface 38. The group of port segments 42, 43 and 44 constitutes one series. The cup 17 may have one such series or a plurality of such series, depending upon the desired flow capacities; two such series are shown in the drawings. The port segments in each series decrease in circumferential width toward the end wall 19 of the cup 17. The adjacent port segments 42 and 43 have end boundaries 42a and 43a in the substantially same transverse plane normal to the cup axis. Similarly, adjacent port segments 43 and 44 have end boundaries 43b and 44a which are in substantially the same transverse plane. The end boundary 44b of the port segment 44 is substantially coincident with the intersection 46 of the cylindrical surface 38 and the frustoconical tapered surface 39. The preferred shape of the individual port segments and their relative position are described in detail in said copending application. The total rate of flow of fluid in the aggregate through these port segments remains substantially constant for any axial position of the movable cup 17 in which the opening 15 encircles the cylindrical surface 38 or the tapered surface 39.

Figure 4:
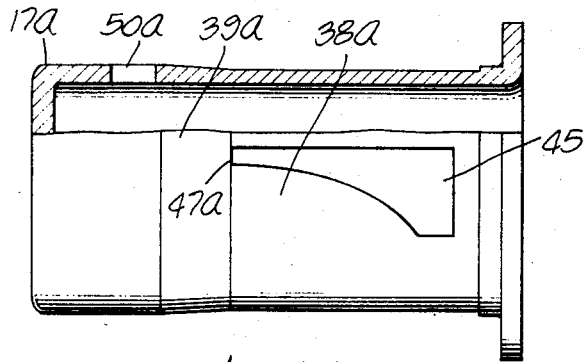
FIG. 4 is a side elevation partly in section, showing a modified form of ported cup.
Figure 5:
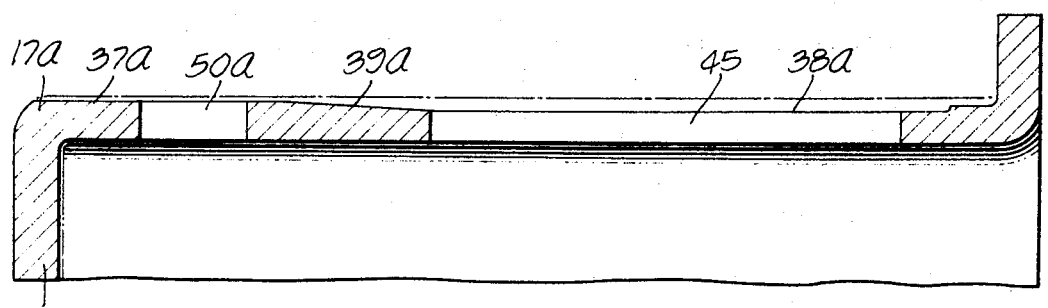
FIG. 5 is a sectional detail of a portion of FIG. 4, shown on an enlarged scale.

In the modified form of the invention shown in FIGS. 4 and 5, the cup 17a is identical to the cup 17 except that the series of port segments 42, 43 and 44 are replaced by one or more continuous symmetrical tapered ports 45. The ports 45 extend through the cylindrical surface 38a and the small end 47a of each port 45 is substantially coincident with the intersection of the cylindrical surface 38a with the frustoconcical tapered surface 39a.

In operation, the flow control valve 10 is secured within the housing 26 by means of the wedge ring 30, and suitable piping connections are made to deliver fluid under pressure to the inlet 31 and to discharge it from the outlet 34. The position of the parts shown in FIG. 2 corresponds to a condition of very low pressure differential between the upstream chamber 32 and the downstream space 33. In this position the cup 17 presents the maximum effective port area for passage of fluid. As the pressure differential increases between the inlet 31 and outlet 34, the cup 17 moves axially into the stationary shell 11 against the force of the spring 22, thereby decreasing the effective exposed port area, with the result that the flow rate remains substantially the same. Under further increases in pressure differential, the frustoconical tapered surface 39 moves axially into the opening 15 in the stationary orifice plate 14, thereby reducing the annular clearance space 41. This clearance space 41 becomes a minimum when the tapered surface 39 slides within the opening 15.

The series of round holes 50, 50a provided in the cylindrical surface 37, 37a near the end wall 19, 19a may vary in number and size. These bypass holes 50, 50a comprise a major part of the total minimum area, the balance being the area of the clearance between the cup and the opening 15.

Plugs 48 and 49 close threaded apertures in the wall of the housing 26. Removal of the plugs permits installation of connectors for pressure sensing apparatus (not shown) for measuring the pressure differential between chamber 32 and space 33.

The use of the frustoconical tapered surface 39 provides a port area change capability lower than the range which can be covered with the practical minimum width of a single port or port segment. Thus, a minimum capacity or area change capability is provided, which is not subject to the limitations of minimum practical port width. The desired capacity change characteristics may be accurately maintained in view of the techniques of accurately controlled inside diameter and outside diameter. The surfaces of minimum capacity passageways are mechanically cleaned by the moving and wiping action as the cup 17 moves through the opening 15 in the orifice plate 14. Working clearances are increased from clearances required to provide the desired minimum capacity, to increased clearances preferred for better working clearance conditions. Moreover, the required minimum working clearances are only present when higher force differentials are available to overcome the possible friction factors which are more likely to exist with tighter clearances. Also, the practical minimum working clearance capacities provided make it possible to utilize the largest minimum fixed capacity ports or holes, thus providing for maximum dirt tolerance.

Having fully described my invention, it is to be understood that I am not to be limited to the details herein set forth but that my invention is of the full scope of the appended claims.

I claim:

1. In a flow control valve, the combination of: a stationary member provided with a circular opening, a ported cup mounted to slide axially within said opening and having a generally cylindrical side wall and an end wall, said side wall of the cup having an outer surface comprising a first cylindrical surface near said end wall and a concentric second cylindrical surface axially spaced therefrom of smaller diameter, and a tapered surface joining said first and second cylindrical surfaces, said side wall including both cylindrical surfaces, and said tapered surface being slidable through said circular opening, the side wall having at least one port extending through said second cylindrical surface, said port and said tapered surface both serving to vary the passage area through the valve.

2. In a flow control valve, the combination of: a stationary member provided with a circular opening, a ported cup mounted to slide axially within said opening and having a generally cylindrical side wall and an end wall, said side wall of the cup having an outer surface comprising a first cylindrical surface near said end wall and concentric second cylindrical surface axially spaced therefrom of smaller diameter, and a tapered surface joining said first and second cylindrical surfaces, the ports in the side wall extending through both of said cylindrical surfaces.

3. The combination set forth in claim 1 in which said port continuously decreases in lateral sidth in an axial direction toward said end wall.

4. In a flow control valve, the combination of: a stationary member provided with a circular opening, a ported cup mounted to slide axially within said opening and having a generally cylindrical side wall and an end wall, a spring within the stationary member acting to oppose movement of the cup into said opening under differential fluid pressure, said side wall of the cup having an outer surface comprising a first cylindrical surface near said end wall and a concentric second cylindrical surface axially spaced therefrom of smaller diameter, and a third frustoconical tapered surface joining said first and second cylindrical surfaces, said side wall including both cylindrical surfaces, and said tapered surface being slidable through said circular opening, the side wall having at least one port extending through said second cylindrical surface, the port being shaped and positioned so that the flow rate of fluid passing through the total area of the ports exposed on one side of the circular opening, and passing through annular clearance space between the cup and the opening, remains substantially constant throughout a range of differential pressures across the cup.

5. The combination set forth in claim 4 in which said ports in the side wall comprise one or more series of circumferentially staggered separate port segments, adjacent port segments in the series having end boundaries in substantially the same transverse plane normal to the cup axis.

6. The combination set forth in claim 4 in which each of said ports comprises a continuous tapered aperture.

7. In a flow control valve, the combination of: a stationary member provided with a circular opening, a ported cup mounted to slide axially within said opening and having a generally cylindrical side wall and an end wall, a spring within the stationary member acting to oppose movement of the cup into said opening, said side wall of the cup having an outer surface comprising a first cylindrical surface near said end wall and a concentric second cylindrical surface axially spaced therefrom of smaller diameter, and a frustoconical tapered surface joining said first and second cylindrical surfaces, said side wall including both cylindrical surfaces, and said tapered surface being slidable through said circular opening, the side wall having a series of circumferentially staggered separate port segments extending through said second cylindrical surface, said series of port segments continuously decreasing in circumferential width from end to end toward the end wall of the cup, and adjacent port segments in the series having end boundaries in substantially the same transverse plane normal to the cup axis.

8. A flow control element for use in flow control valve, comprising: a cup having a generally cylindrical side wall and an end wall, said side wall of the cup having an outer surface comprising a first cylindrical surface near said end wall and a concentric second cylindrical surface axially spaced therefrom of smaller diameter, and a third tapered surface joining said first and second cylindrical surfaces, the ports in the side wall extending through both of said cylindrical surfaces.

* * * * *